Dec. 4, 1945.  N. ERLAND AF KLEEN  2,390,085
REFRIGERATION
Original Filed Feb. 9, 1940
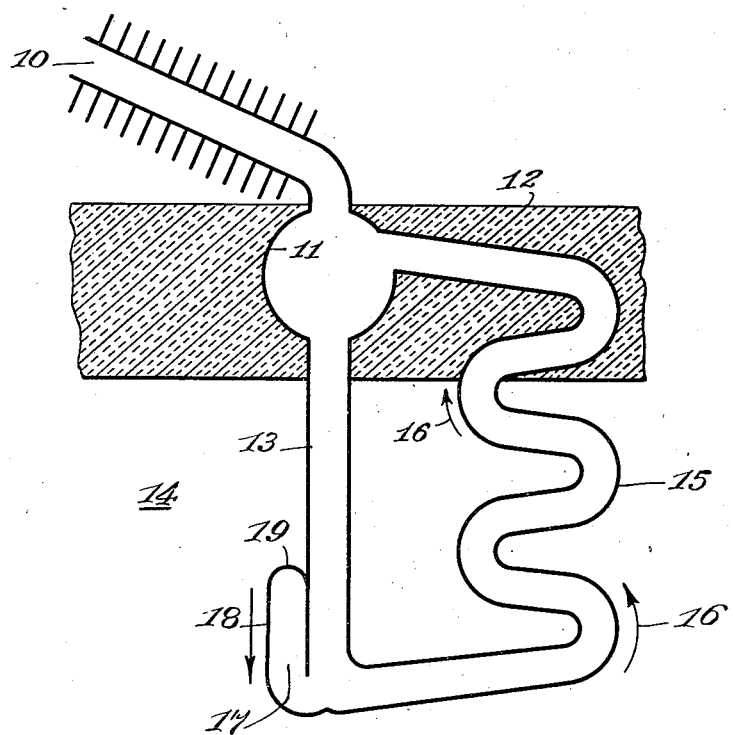
INVENTOR.
Nils Erland af Kleen
BY
C. P. Goepel
his ATTORNEY Patented Dec. 4, 1945

2,390,085

UNITED STATES PATENT OFFICE 2,390,085

REFRIGERATION

Nils Erland af Kleen, Stockholm, Sweden, assignor to Kleen Refrigerator, Inc., Hoboken, N. J., a corporation of Delaware Original application February 9, 1940, Serial No. 318,148. Divided and this application May 4, 1943, Serial No. 485,598. In Great Britain August 3, 1939

4 Claims. (Cl. 62—126)

This invention relates to new and useful improvements in refrigeration and is a division of my co-pending application Ser. No. 318,148, filed Feb. 9, 1940, now Patent No. 2,331,898, the present invention having for its primary object to increase the fluid movement through the evaporating system of absorption type refrigerating apparatus.

To this end the invention consists in the provision of means forming an upwardly extending evaporating chamber closed at its upper end and in open fluid communication at its lower end with the evaporating system below the level of liquid in the latter so that the refrigerant vapor formed in the chamber as a result of evaporation of the liquified refrigerant therein is trapped above the level of liquid and, as evaporation continues in said chamber, the accumulated vapor breaks the liquid seal to pass into the evaporating system. In this manner pulses or surges are created in the evaporating system by a volume of vapor passing from the auxiliary evaporating chamber to assist the movement of vapor formed in the evaporating system and speed up the fluid movement through the system.

Other novel features of the invention will become apparent from the following description taken in conjunction with the accompanying drawing which illustrates diagrammatically a portion of intermittent absorption type refrigerating apparatus including a condenser 10 adapted to receive refrigerant vapors generated from any suitable source (not shown) and connected to flow liquefied refrigerant to a receptacle 11 disposed in the upper portion of a refrigerator cabinet or the like 12 and preferably heat insulated to prevent evaporation of the refrigerant from taking place therein. From the bottom of the receptacle 11, the liquefied refrigerant enters a down-pipe 13 extending into the storage space 14 of the cabinet and passes into an upwardly extending evaporator coil 15 connected at its lower end to the bottom of the down-pipe 13 and terminating at its upper end in fluid communication with the upper portion of the receptacle 11 above the level of liquid in the latter. In this manner, liquefied refrigerant flowing to the receptacle 11 fills the down-pipe and seeks its level in the coil 15 and the refrigerant vapor formed as a result of evaporation in the coil 15 passes into the upper portion of the receptacle 11 to return to the absorber (not shown), the flow of the refrigerant vapor through the coil 15 being indicated by the arrows 16.

Appended to the evaporator coil 15 at a suitable point to receive heat independently of the latter there is provided an auxiliary evaporating chamber 17 formed by an upwardly extending conduit 18 closed at its upper end as at 19 and in open fluid communication at its lower end with the lower portion of the evaporator coil 15 to receive refrigerant liquid from the down-pipe 13. The conduit 18 is formed with walls of thin metal or any other material sensitive to small variations of temperature and thus provides a zone of evaporation separate from that provided by the evaporator coil 15. The vapors produced by evaporation of refrigerant liquid in the chamber 17 are trapped in the closed end of the latter above the level of liquid and, as evaporation continues in the chamber, the quantity of liquid gradually diminishes until the seal at the lower open end of the chamber is broken. When this occurs, the accumulated volume of vapor in the chamber 17 will rush into the inlet end of the evaporator coil 15 and be replaced by refrigerant liquid through the lower open end of the chamber to repeat the operation just described as long as there is enough liquid refrigerant in the down-pipe 13 to seal the lower end of the conduit 18. In this manner, pulses or surges are created in the evaporating system during the refrigeration periods of the apparatus by the periodic release of a volume of vapor from the auxiliary evaporating chamber into the evaporator coil 15 which will increase fluid movement in the latter and effect a movement of vapor.

In other words, by evaporating a portion of the refrigerant liquid in an auxiliary evaporating chamber appended to the evaporating system and trapping the vapor thus formed in the said chamber, as contemplated by the invention, and thereafter periodically discharging such trapped vapor into the evaporating system, the vapor bubbles formed in the evaporating system as the result of ebullition taking place therein are periodically swept out of the system by the sudden rush of vapor from the aforesaid appended chamber. Consequently, instead of having vapor bubbles standing still or moving slowly along the evaporating surface of the evaporating system and thereby impairing the total cooling capacity of the system, such vapor bubbles are removed from the system and are replaced by refrigerant liquid to be evaporated.

It will be appreciated that by creating pulses or surges in the liquid contained in the evaporating system as contemplated by the invention the disengagement of vapor from the liquid refrigerant contained therein will be greatly facilitated with attendant increased efficiency of the evaporating system.

It will also be observed that by creating impulse or surges in the evaporating system of intermittent type refrigeration apparatus to sweep out the vapor bubbles from the evaporating system in accordance with the invention, the time required for the absorbing period of the apparatus, that is, for the refrigerant to evaporate and be absorbed, will be reduced an appreciable extent.

Although I have shown only one conduit 18 forming an auxiliary evaporating chamber 17, several such conduits may be provided to increase the fluid movement in the evaporation system still further.

From the foregoing it is believed that the operation and advantages of the invention will be readily understood by those skilled in the art without further description, it being borne in mind that numerous changes may be made in the details disclosed without departing from the spirit of the invention as set out in the following claims.

What I claim is:

1. In refrigerating apparatus; a receptacle adapted to receive refrigerant liquid, a down-pipe connected for the gravity flow of liquid from the bottom of said receptacle, an upwardly extending conduit in fluid communication at its lower end with the lower portion of said down-pipe and in fluid communication at its upper end with the upper portion of said receptacle, and an upturned conduit closed at its upper end and in open communication at its lower end with the lower portion of said down-pipe, said first named conduit being constructed and arranged to provide a zone of evaporation and said second named conduit being constructed and arranged to provide an auxiliary zone of evaporation exteriorly of said first named zone, the lower open end of said second named conduit being sealed by the liquid in said down-pipe, and the vapor formed in said auxiliary zone of evaporation periodically breaking the seal to pass as a volume of free vapor into said first named conduit.

2. In refrigerating apparatus; a receptacle adapted to receive refrigerant liquid, a down-pipe connected for the gravity flow of liquid from the bottom of said receptacle, an upwardly extending conduit in fluid communication at its lower end with the lower portion of said down-pipe and in fluid communication at its upper end with the upper portion of said receptacle, and an upturned conduit closed at its upper end and in open communication at its lower end with the lower portion of said down-pipe, said first named conduit being constructed and arranged to provide a zone of evaporation disposed on one side of said down-pipe, and said second named conduit being constructed and arranged to provide another zone of evaporation exteriorly of said first named zone and disposed on another side of said down-pipe, the lower open end of said second named conduit being sealed by the liquid in said down-pipe, and the vapor formed in said second zone of evaporation periodically breaking the seal to pass as a volume of free vapor into said first named conduit.

3. An intermittent type absorption refrigerating system including a condenser, a receptacle connected to receive refrigerant liquid from said condenser during the generating periods of the system, a down-pipe connected for the gravity flow of liquid refrigerant from the bottom of said receptacle, an upwardly extending conduit in fluid communication at its lower end with the lower portion of said down-pipe and in fluid communication at its upper end with the upper portion of said receptacle, and another upwardly extending conduit closed at its upper end and in open communication at its lower end with the lower portion of said down-pipe, said first named conduit being constructed and arranged to provide a zone of evaporation, and said second named conduit being constructed and arranged to provide another zone of evaporation exteriorly of said first named zone, the lower open end of said second named conduit being sealed by the liquid in said down-pipe, and the vapor formed in said second zone of evaporation periodically breaking the seal to pass as a volume of free vapor into the said first named conduit.

4. In refrigerating apparatus; a receptacle adapted to be supplied with refrigerant liquid, a down-pipe connected for the gravity flow of refrigerant liquid from the bottom of said receptacle, an upwardly extending evaporator coil in open fluid communication at its lower end with the lower portion of said down-pipe and in open communication at its upper end with the upper portion of said receptacle, and an upwardly extending conduit closed at its upper end and in open communication at its lower end with the lower portion of said down-pipe, said conduit being constructed and arranged to provide an auxiliary zone of evaporation exteriorly of said evaporator coil, the lower open end of said conduit being sealed by liquid in said down-pipe, and the vapor formed in said conduit periodically breaking the seal to pass as a volume of free vapor into said evaporator coil.

NILS ERLAND AF KLEEN.